United States Patent
Agarwal et al.

(10) Patent No.: US 6,407,171 B1
(45) Date of Patent: Jun. 18, 2002

(54) BLENDS OF POLYETHYLENE AND POLYPROPYLENE

(75) Inventors: Pawan K. Agarwal, Houston; Armenag H. Dekmezian, Kingwood, both of TX (US)

(73) Assignee: Exxon Chemical Patents Inc., Houston, TX (US)

(*) Notice: Subject to any disclaimer, the term of this patent is extended or adjusted under 35 U.S.C. 154(b) by 0 days.

(21) Appl. No.: 09/468,290

(22) Filed: Dec. 20, 1999

(51) Int. Cl.[7] .......................... C08L 23/00; C08L 23/04
(52) U.S. Cl. ........................ 525/191; 525/240
(58) Field of Search .................. 525/191, 240

(56) References Cited

U.S. PATENT DOCUMENTS

| | | | |
|---|---|---|---|
| 4,565,847 A | 1/1986 | Bahl et al. | 525/240 |
| 4,929,681 A | 5/1990 | Bahl et al. | 525/240 |
| 4,937,299 A | 6/1990 | Ewen et al. | 526/119 |
| 6,300,419 B1 * | 10/2001 | Sehanobish et al. | 525/191 |

* cited by examiner

*Primary Examiner*—Nathan M. Nutter
(74) *Attorney, Agent, or Firm*—Frank E. Reid; Charles Edwin Bunyon, Jr.

(57) ABSTRACT

Disclosed are compositions comprising: a) an ethylene polymer component having a melting temperature greater than or equal to about 75° C., an ethylene crystallinity level of 5 weight percent or more, and a narrow compositional distribution; and b) a propylene polymer component having a melt flow rate of 500 dg/min. or more at 230° C. and a melting temperature greater than or equal to about 125° C.

11 Claims, No Drawings

BLENDS OF POLYETHYLENE AND POLYPROPYLENE

SUMMARY

This invention relates to blends of polyethylene with polypropylene and to films made herefrom having improved tear strength.

BACKGROUND

Plastic films have found utility in a wide variety of packaging applications such as bags, pouches, tubes, trays, and the like. In many film packaging applications it is desirable for the film to possess good physical and mechanical properties such as resistance to tearing, tensile strength, and proccessability in high speed equipment.

Linear low and medium density polyethylene copolymers (LLDPE) produced with conventional Zeigler-Natta catalysts are widely used commercially in films which are conventionally prepared by blown film extrusion. Such films have generally good properties, but often exhibit undesirably low stiffness for many uses. Some such films are also difficult to process and consume a great deal of power to extrude and draw down the film. To address such shortcomings, many have developed blends with other polymers to tailor the balance of properties.

For example, U.S. Pat. No. 4,565,847 describes films formed from blends of LLDPE, polypropylene and ethylene-propylene rubbers having improved stiffness and good tear strength. U.S. Pat. No. 4,929,681 discloses films containing LLDPE having high modulus and good tear strength. The high modulus and improved processing conditions are achieved by blending minor amounts of polystyrene (or other aromatic polymer) and polypropylene with the LLDPE. In both of these inventions, the addition of a minor amount of polypropylene to LLDPE produced with conventional Ziegler-Natta catalysts showed an improvement in the modulus of the film but a decrease in the MD tear strength. The further addition of EPDM or polystyrene was required to achieve a desired balance of properties.

Some of the deficiencies of polymers produced with Zeigler-Natta catalysts are improved in polymers produced with metallocene catalysts. Some of these improvement result from the ability of metallocene catalyst to control certain structural variables in polyolefins which affect the ultimate properties of the polymer. Some of the most important structural variables are composition distribution (CD), molecular weight, and MWD. CD refers to the distribution of comonomer between copolymer molecules. This feature relates directly to polymer crystallizability, optical properties, toughness and many other important use characteristics. MWD plays a significant role in melt processability as well as in physical properties. Broadly speaking, weight average molecular weight ($M_w$) is strongly related to melt viscosity and the ultimately desired physical properties of the polymer. All of these structural features are readily controllable through the use of metallocene catalysts as exemplified in U.S. Pat. No. 4,937,299, which is fully incorporated by reference herein for purposes of U.S. patent practice.

Three distinctive features of films produced from copolymers produced with metallocene catalysts relative to conventional Ziegler-Natta copolymers are their low extractables (and associated low reblock), their good clarity, and their unusual tensile properties at low elongation. It would be desirable to produce a film having improved balance of stiffness, tear strength, clarity, and low extractables. Although polymers produced with metallocene catalysts provide many property enhancements over those produced with Zeigler-Natta catalysts, a film property where metallocene-produced copolymers do not compare as favorably to those made with conventional Ziegler-Natta catalysts is tear strength in the machine direction.

In view of the ongoing need for films of optimum quality for growing market needs, it would be desirable to provide compositions that utilize the ability of metallocene catalysts to tailor polymer structure for an improved balance of properties while using as few blend components and processing steps as possible.

Accordingly, the present invention relates to blends of polyethylene having those desirable qualities resulting from production with a metallocene catalyst system and a polypropylene component having a high melt flow rate (MFR). The blends of the present invention are particularly useful in film applications requiring tear strengths and stiffness as high or higher than those produced with Ziegler-Natta catalysts without compromising clarity, low extractables content, and other attractive attributes of films formed from polyethylene polymers produced using metallocenes or other single-site catalyst systems.

SUMMARY OF THE INVENTION

According to one embodiment of this invention there are provided polymer blend compositions comprising: (a) an ethylene polymer component, having a melting temperature greater than or equal to 75° C. and crystallinty as measured by differential scanning calorimetry (DSC) of 10% or more, and (b) a propylene polymer component, having a melting temperature greater than or equal to 125° C. and a MFR of 500 dg/min. or more at 230° C. Preferably, both polymer components are produced with a metallocene catalyst system. In the polymer blend, component (a) is preferably about 90 to about 99.9 weight percent of the blend based on the total weight of (a) and (b). The polymer blend is formed by mixing blend components (a) and (b) under high shear mixing conditions. A unit such as a twin-screw extruder would be an example of a suitable piece of mixing equipment. Other means to achieve a well mixed blend will be apparent to those skilled in the art.

Another embodiment of this invention comprises film or sheet articles formed from a polymer blend as described above. According to yet another embodiment of this invention there are provided multiple layer films comprising at least one layer formed from the polymer blend as described above.

DESCRIPTION OF THE INVENTION

The polymer blends of this invention include, and preferably consist essentially of (a) an ethylene polymer component produced with a metallocene catalyst; and (b) a propylene polymer component having a high melt flow rate and preferably produced using a metallocene catalyst. All references to metallocene catalyst shall include other catalysts (e.g. single-sited catalyst) capable of producing polymers having properties the same as or similar to metallocene-produced polymers (e.g. narrow MWD, narrow CD, low extractables content, good optical properties). Such blends can optionally include additives well known to those skilled in the art.

The ethylene polymer component can be a single polyethylene polymer or a blend of two or more polyethylenes. The ethylene polymer component has a melting temperature greater than or equal to 75° C. and crystallinty of 10% or more DSC. If the ethylene polymer component is a blend of more than one ethylene-based polymer, preferably each ethylene polymer so blended will also have a melting temperature greater than or equal to 75° C. and crystallinty of 10% or more as measured by DSC.

Polyethylene, as used herein, can be a homopolymer or a copolymer and includes plastomers, VLDPE, LLDPE, LDPE, and HDPE. Plastomers, as used herein, refers generally to a class of ethylene based copolymers with density of less than about 0.900 g/cc (down to about 0.865 g/cc) and having a weight average molecular weight ($M_w$) greater than about 20,000 (about 200 MI and lower). Plastomers have an ethylene crystallinity between plastics (i.e. linear low density and very low density polyethylenes) and ethylene/alpha-olefin elastomers. VLDPE is very low density polyethylene, typically having a density in the range of from 0.90 to 0.915 g/cc. LLDPE is linear low density polyethylene, typically having a density in the range of from 0.915 to 0.930 g/cc. LDPE is low density polyethylene, typically having a density in the range of from 0.915 to 0.930 g/cc. HDPE is high density polyethylene, typically having a density in the range of from 0.930 to 0.960 g/cc. Densities above about 0.90 g/cc were measured using standard accepted procedures. At densities below about 0.90 g/cc, the samples are preferably conditioned by holding them for 48 hours at ambient temperature (23° C.), prior to density measurement.

The melt index (MI) of the ethylene polymer component of the present invention is in the range of about 0.2 dg/min to about 10 dg/min. Preferably the MI is in the range of about 0.4 dg/min. to about 8 dg/min. For blown film applications, the most preferred range is 0.5 dg/min to about 2 dg/min. For cast film applications, the most preferred range is 1 dg/min to about 7 dg/min.

The ethylene polymer component of the present invention preferably has melting point characteristics with a major melting point ($T_m$) as determined by Differential Scanning Colorimetry (DSC) in the range of about 50° C. to about 140° C. Preferably, the DSC peak, or $T_m$, is in the range of about 60° C. to about 125° C. "Melting point" as used herein means that at least about 80% by weight of the material corresponds to a single $T_m$ peak in the range of about 60° C. to about 125° C. Preferably, substantially all the ethylene polymer component melts prior to reaching a temperature of about 140° C., as determined by DSC analysis.

The polyethylene polymers utilized in the polyethylene component of the blends of the present invention, comprise ethylene and one or more alpha-olefins. Such α-olefins include linear, branched, or ring-containing $C_3$ to $C_{30}$ α-olefins or combinations thereof capable of being copolymerized with ethylene by a selected metallocene or other single-site catalyst. Preferred linear α-olefins include $C_3$ to $C_8$ α-olefins, more preferably propylene, 1-butene, 1-hexene, and 1-octene, even more preferably propylene or 1-butene. Preferred branched α-olefins include 4-methyl-1-pentene, 3-methyl-1-pentene, and 3,5,5-trimethyl-1-hexene as well as geminally di-substituted such as isobutylene. Preferred ring-containing olefins include norbornene and alkyl-substituted norbornene such as methyl-norbornene. Generally, such polyethylenes will comprise in the range of about 85 to about 96 mole percent ethylene.

Preferred polyethylene copolymers are produced with metallocene catalysis and display narrow molecular weight distribution, meaning that the ratio of the weight average molecular weight to the number average molecular weight will be equal to or below 4, most typically in the range of from 1.7 to 4.0, preferably from 1.8 to 2.8.

Preferably, polyethylene copolymers produced with metallocene catalysts will also display narrow composition distribution, meaning that the fractional comonomer content from molecule to molecule will be similar. This can be measured using Fourier Transform Infrared Spectroscopy coupled to a Gel Permeation Chromatograph (GPC-FTIR) to determine comonomer content in discrete ranges of number or weight average molecular weights ($M_n$ or $M_w$), or by using a Temperature Rise Elution Fractionation analysis to determine the composition distribution breadth index (CDBI) or solubility distribution breadth index (SDBI). A preferred polyethylene copolymer has a comonomer distribution when measured by GPC-FTIR such that the comonomer content of any discreet molecular weight range comprising 10 weight % or more of the total eluted copolymer is within ±30% of the weight average comonomer content of the polyethylene copolymer where this average equates to 100%, more preferably within ±20%, even more preferably within ±10%. Where measurement by SDBI is applicable, the SDBI of the polyethylene copolymer is preferably less than about 35° C., generally in the range of about 10° to about 25° C., preferably in the range of about 15° to about 20° C., and most preferably in the range of about 15° to about 18° C. Where CDBI is applicable, the CDBI of the polyethylene copolymer is preferably greater than 40%, more preferably greater than 50%, even more preferably greater than 60%. The polyethylene copolymer has a narrow compositional distribution if it meets the GPC-FTIR, CDBI, or SDBI criteria as outlined above.

In a particularly preferred embodiment, the copolymer is a single-site catalyzed "polyethylene," preferably produced using metallocene catalysis. "Polyethylene," as used herein, means a copolymer in which ethylene is the major monomer. Such polyethylene materials are commercially available from Exxon Chemical Company of Houston, Tex. under the trade name "Exact™". These materials may be made in a variety of processes (including slurry, solution, high pressure and gas phase) employing metallocene catalysts. Processes for making a variety of polyethylene materials with metallocene catalyst systems are well known. See, for example, U.S. Pat. Nos. 5,017,714, 5,026,798, 5,055,438, 5,057,475, 5,096,867, 5,153,157, 5,198,401, 5,240,894, 5,264,405, 5,278,119, 5,281,679, 5,324,800, 5,391,629, 5,420,217, 5,504,169, 5,547,675, 5,621,126, 5,643,847, 5,801,113, 5,408,017, 5,621,054, 5,635,573, 5,767,208, 5,851,945, 5,866,665, 5,942,587, and 5,972,823, U.S. patent application Ser. Nos., 08/877,390, 08/473,693, and 60/048, 965, and international patent application nos. EPA 277,004, WO 92/00333, and WO 94/03506, each fully incorporated herein by reference for purposes of U.S. patent practice. Production of copolymers of ethylene and cyclic olefins are described in U.S. Pat. Nos. 5,635,573 and 5,837,787, and of copolymers of ethylene and geminally di-substituted monomers, such as isobutylene, are described in U.S. Pat. No. 5,763,556, all of which are fully incorporated herein for purposes of U.S. patent practice.

Utilizing a metallocene catalyst, the polyethylene polymers useful in the ethylene polymer component of the present invention can be produced in accordance with any suitable polymerization process, including a slurry polymerization, gas phase polymerization, and high pressure polymerization process.

The polypropylenes useful in this invention are homopolymers or copolymers of propylene and one or more olefins selected from ethylene or linear or branched $C_4$ to $C_{20}$ α-olefins, preferably ethylene or $C_4$ to $C_8$ alpha-olefins, more preferably ethylene, 1-butene, 1-hexene, 4-methyl-1- pentene, 3-methyl-1-pentene, 3,5,5-trimethyl-1-hexene, and 1-octene, even more preferably propylene or 1-butene, and optionally, minor amounts of non-conjugated diolefins, preferably $C_6$–$C_{20}$ diolefins. In one embodiment, the alpha-olefin can contain cyclic structures that are fully saturated such that the alpha-olefin monomer does not contain a cyclic moiety with any olefinic unsaturation or any aromatic structures. Preferred alpha-olefins are mono-olefins. These propylene copolymers with prescribed range of comonomer levels can be prepared by polymerization of the suitable olefins in the presence of supported or unsupported metallocene catalyst systems.

Isotactic polypropylene homopolymer is preferred over random copolymers having a high propylene content since both crystallinity and melting temperatures decrease as comonomer content increases. The concept of blending a small amount of polypropylene with the polyethylene component would however also apply to polypropylene copolymers having small amounts of α-olefins such as ethylene-1, butene-1, hexene-1, and octene-1.

The propylene-based polymer component of the present invention is a polypropylene homopolymer, a random copolymer of polypropylene, or a mixture thereof, wherein the propylene-based polymer component has an MFR or 500 dg/min. or more at 230° C. as measured by ASTM D-1238, preferably 1000 dg/min. or more, more preferably 1500 dg/min. or more. Even more preferably, the propylene-based polymer component copolymer is isotactic polypropylene homopolymer having a MFR as specified above. Even more preferably, the propylene based polymer will also have a MWD of from 1.8 to 4.0. Such polymers are conveniently produced using a stereospecific metallocene catalyst system.

When the propylene-based polymer component either consists of or contains one or more copolymers, such copolymers are preferably composed of propylene as a main monomer and an alpha-olefin other than propylene. The content of the propylene is generally 88 mole percent or more, more preferably 99 mole percent or more. The content of the alpha-olefin (e.g. ethylene) other than propylene is generally 12 mole percent or less, more preferably 1 mole percent or less.

The crystallinity in the polypropylene copolymer are derived from isotactic or syndiotactic polypropylene sequences, preferably isotactic polypropylene sequences, obtained by use of a stereospecific metallocene catalyst and limiting the amount of comonomer. Preferred polypropylene polymers have an average propylene content on a molar basis of about 95% or more, preferably 98% or more, more preferably 100%. The balance of the copolymer is one or more linear or branched α-olefins as specified above and optionally minor amounts of one or more diene monomers.

The semi-crystalline propylene-based polymer component preferably has a heat of fusion from about 10 J/g to about 160 J/g, more preferably from about 1.9 J/g to about 151 J/g, more preferably from about 28 J/g to about 142 J/g, even more preferably from about 38 J/g to about 113 J/g. The crystallinity of the polypropylene copolymer arises from crystallizable stereoregular propylene sequences.

In another embodiment, the crystallinity of the propylene-based polymer component is expressed in terms of percent crystallinity. The thermal energy for the highest order of polypropylene is estimated at 189 J/g. That is, 100% crystallinity is equal to 189 J/g. Therefore, according to the aforementioned energy levels, the present invention preferably has a polypropylene crystallinity of about 5% to about 85%, more preferably from about 10 % to about 80%, even more preferably from about 15% to about 75%, even more preferably from about 20% to about 60%.

The propylene-based polymer component preferably has a single melting point $(T_m)$ in the range of from about 25° C. to about 110° C., preferably in the range of from about 30° C. to about 105° C., more preferably in the range of from about 35° C. to about 90° C.

The polypropylene copolymer of the present invention preferably comprises a random crystallizable copolymer having a narrow compositional distribution. The intermolecular composition distribution of the polymer is determined by thermal fractionation in a solvent. A typical solvent is a saturated hydrocarbon such as hexane or heptane. This thermal fractionation procedure is described below. Typically, approximately 75% by weight and more preferably 85% by weight of the polymer is isolated as one or two adjacent, soluble fraction with the balance of the polymer in immediately preceding or succeeding fractions. Each of these fractions has a composition (wt. % ethylene, or other α-olefin, content) with a difference of no greater than 20% (relative) and more preferably 10% (relative) of the average weight % comonomer, such as ethylene or other α-olefin, content of the polypropylene copolymer. The polypropylene copolymer has a narrow compositional distribution if it meets the fractionation test outlined above.

Preferred propylene-based polymer components according to the invention are conveniently prepared by polymerizing propylene and optionally one or more $C_2$ or $C_4$–$C_{20}$ alpha olefin comonomers in the presence of a chiral metallocene catalyst with an activator and optional scavenger, most preferably ethylene and propylene. Preferred stereospecific metallocenes are those known to favor incorporation of propylene in predominantly isotactic polypropylene pentads and statistically random incorporation of the α-olefin or other olefinic comonomer(s). Stereospecific catalysts for the production of the crystalline polymer segments (isotactic or syndiotactic alpha-olefin-diene copolymers) of this invention include any catalyst system capable of copolymerizing the select alpha-olefin monomer(s) and diolefin monomer(s). Such stereospecific catalysts should at the same time polymerize the alpha-olefin monomer(s) in a stereospecific structure such that the crystalline polymer segments contain isotactic or syndiotactic monomer sequences sufficient to produce a heat of fusion, as measured by DSC, of 10 J/g or more. For additional detail on such catalysts, reference can be made to U.S. Pat. No. 5,770,753 and to W. Spaleck, et al., "The Influence fo Aromatic Substituents on the Polymerization Behavior of Bridged Zirconocene Catalysts," Organometallics, 13, 954–963 (1994), both of which are fully incorporated by reference herein for purposes of U.S. patent practice.

Such catalysts are known to those skilled in the art. For additional details on such catalysts, reference can be made to U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614, all of which are incorporated by reference for purposes of U.S. patent practice.

Illustrative, but not limiting examples of preferred stereospecific metallocene catalysts for the synthesis of propylene-based polymers, are the racemic isomers of:
[dimethylsilanediylbis(2-methyl-4-phenylindenyl)]metal dichloride;
[dimethylsilanediylbis(2-methyl)]metal dichloride;
[dimethylsilanediylbis(indenyl)metal dichloride;
[dimethylsilanediylbis(indenyl)metal dimethyl;

[dimethylsilanediylbis(tetrahydroindenyl)metal dichloride;
[dimethylsilanediylbis(tetrahydroindenyl)metal dimethyl;
[dimethylsilanediylbis(indenyl)metal diethyl; and
[dibenzylsilanediylbis(indenyl)metal dimethyl;
wherein the metal can be chosen from Zr, Hf, or Ti, preferably Zr.

Wherein M is chosen from a group consisting of Zr, Hf, or Ti.

The polypropylene polymer component can be a single polypropylene or a blend of two or more polypropylenes. The propylene polymer component has a melting temperature greater than or equal to 125° C. and a melt flow rate (MFR) of 500 dg/min. or more at 230° C. If the propylene polymer component is a blend of more than one polypropylene, preferably each propylene polymer so blended will also have a melting temperature greater than or equal to 125° C. and a melt flow rate (MFR) of 500 dg/min. or more at 230° C.

The blend composition will generally comprise in the range of about 90 to about 99.9 weight percent, low melting ingredient and in the range of about 10 to about 0.1 weight percent of a propylene based polymer both based on the total weight of the low melting ingredient and propylene based polymer. These are preferred ranges. The particular polyethylene component, the particular polypropylene component, and the relative amounts of each used in the blend of this invention will depend on the requirements of the particular application in which the blend will be utilized, economics, and other process factors. Generally a beneficial contribution from the addition of the polypropylene component will be noted at a level of about 5 wt %. At a level above 10 wt % polypropylene component, the blend product may show deficiencies in properties such as rigidity, abrasion resistance, and elevated temperature resistance, among others.

With respect to the physical process of producing the blend, sufficient mixing should take place to assure that a uniform blend will be produced prior to conversion into a finished product. Thus, in the cases of injection molding of medical devices, casting and blowing of packaging films, extrusion of tubing and profiles, etc. simple solid state blends of the pellets serve equally as well as pelletized melt state blends of raw polymer granules, of granules with pellets, or of pellets of the two components since the forming process includes a remelting and mixing of the raw material. In the process of compression molding of medical devices, however, little mixing of the melt components occurs, and a pelletized melt blend would be preferred over simple solid state blends of the constituent pellets and/or granules. Those skilled in the art will be able to determine the appropriate procedure for blending of the polymers to balance the need for intimate mixing of the component ingredients with the desire for process economy.

The polymer blend compositions of the present invention can be cast extruded or coextruded into film using a flat die or blown extruded or coextruded into film using a tubular die. Such films may optionally be further oriented (either uniaxially or biaxially) using technologies well known to those skilled in the art. The films formed from the composition of the invention are useful as shrink films, cling film, stretch film, sealing films, oriented films, snack packaging, heavy duty bags, grocery sacks, baked and frozen food packaging, medical packaging, industrial liners, membranes, etc. in food-contact and non-food contact applications.

In some applications, for example in food and flexible packaging, it is important that the amount of haze in the final film be minimized so that the film can clearly display the packaged contents and be aesthetically pleasing. In selecting the low melting polymer ingredient and the propylene based polymer, it is believed that a deterioration of haze can be mitigated by blending low melting polymer ingredient and propylene based polymer having similar densities to minimize refractive index differences, and having similar rheologies (i.e. shear viscosities under processing conditions) to obtain optimum dispersed phase domain size/morphology.

The polymer components used to fabricate the films of the present invention may also contain appropriate amounts of other additives normally included in such compositions. These include slip agents, such as talc, antioxidants, fillers, dyes, pigments, stabilizers, such as radiation stabilizers, and like additives known to those skilled in the art.

Some preferred properties of the final composition and film are, tensile strength, film rigidity, haze, gloss, and tear strength. The extractables content for the compositions of the invention and films therefrom is preferably less than or equal to 2.0 wt. %, more preferably less than or equal to 1.6 wt. %, most preferably less than or equal to 1.4 wt. % as measured by ASTM D-5227. Typically, however, the extractables content will be at least 0.5 wt. %.

Haze values for the compositions of the invention and films therefrom are preferably less than or equal to 25%, more preferably less than 20%, even more preferably less than 15%. Typically, however, haze values for the compositions and films of the invention can be 2% or more, and frequently 5% or more.

Films according to the invention are formed by any suitable method well known in the art, or once formed, the film can be subjected to a combination of post orienting and/or annealing to effect changes in its unload power. Such methods of making film are discussed by J. H. Briston and L. L. Katan in *Plastic Films*, (2nd ed. 1983) and U.S. Pat. Nos. 4,436,520 and 5,066,526, all of which are herein incorporated by reference for purposes of U.S. patent practice. Commonly known methods of producing film include casting (extrusion and solvent), calendering, and extrusion methods, such as blow, slit extrusion, or cast die extrusion.

Regardless of the method of first producing the film, once made, the film can be used as is, or it can be further processed to improve unload power of the film. This is accomplished by a combination of orienting and/or annealing the film. In one embodiment, the annealing is conducted at a temperature between the film softening point and melting point.

Orientation of non-elastic films to improve clarity, impact strength and, particularly in the case of polypropylene, its barrier properties, is well known in the art. The orienting and annealing of the film may be carried out monoaxially in the machine direction (MD) or the transverse direction (TD) or in both directions (biaxially) either simultaneously or sequentially using conventional equipment and processes following cooling of the film.

Blown films are preferentially stretched in machine direction or in both directions. Cast films are preferably stretched in the machine direction. Generally, for orientation in the machine direction, the film is passed around two rollers driven at different surface speeds and finally to a take up roller. The second driven roller which is closest to the take up roll is driven faster than the first driven roller. As a consequence the film is stretched between the driven rollers. Conventional "godet" stands as are well known in the art may also be utilized.

Film orientation in another embodiment may also be carried out in a tentering device with or without machine direction orientation to impart transverse direction orientation in the film. The film is gripped by the edges for processing through the tentering device. For most final applications, the film is monoaxially oriented in the machine direction.

In one embodiment, the film of the invention is annealed at a temperature between the film softening point and melting point. The annealing step is necessary to anneal or perfect the crystallites that survived the orienting step and to relax out stresses. This annealing aids in maintaining the orientation or extension induced in the orienting step. The annealing temperature is preferably less than the orienting temperature. Generally once the film leaves the annealing step, ambient cooling is sufficient. In most cases, the film from the annealing step is then spooled in a winding unit.

In yet another embodiment, at least one layer formed from the composition of the invention and at least one additional layer are joined to form a multi-layer film. The layers can be joined by lamination, heat sealing, co-extrusion, or any method of joining film layers well known to those skilled in the art. The additional layer or layers can be the same or different polymers.

EXAMPLES

Tests and Standards

Density measurements were made according to ASTM D-792.

Molecular weight distribution (MWD) means $M_w/M_n$ where $M_w$ is the weight average molecular weight and is $M_n$ the number average molecular weight as determined by gel permeation chromatography using polyisobutylene standards on a Waters 150 gel permeation chromatograph detector and an on-line Chromatix KMX-6 light scattering photometer. The system is used at 135° C. with 1,2,4-trichlorobenzene as the mobile phase. Showdex (from Showa Denko America, Inc.) polystyrene gel columns 802, 803, 804 and 805 were used. This technique is discussed on "Liquid Chromatography of Polymers and Related Materials III" J. Cazes editor, Marcel Dekker, 1981, p. 207. No corrections for column spreading were employed. $M_w/M_n$ was calculated from elution times. The numerical analyses were performed using the commercially available Beckman/CIS LALLS software in conjunction with the standard Gel Permeation package.

Haze was measured according to ASTM D-1003.

Gloss was measured according to ASTM D-2457.

Tensile stress at yield, elongation at yield, ultimate tensile strength, elongation at break, and secant modulus (1%) were measured according to ASTM D-882.

Elmendorf tear, machine direction (MD) and transverse direction (TD), Tensile Tear, Y Mod., and Notch Tensile Tear, were measured according to ASTM D-1922.

Differential Scanning Calorimetry (DSC), ASTM E-1356, at a heating rate of 10° C./minute). DSC measurements were made on a Perkin Elmer System 7 Thermal Analysis System. Melting information reported are second melting data i.e. sample heated at programmed rate of 10° C. min. to a temperature above its melting range. Sample then cooled in instrument at programmed rate of 10° C./min. to temperature below its crystallization range. Sample reheated (2nd melting) at programmed rate of 10° C./min.

Melting point ($T_m$), glass transition temperature ($T_g$), heat of fusion ($\Delta h_f$), multiple melting peak, and any measurements related to detection of crystalline melting or crystallization are measured using Differential Scanning Calorimetry (DSC) or obtained from commonly accepted publications such as typical transition temperatures shown in Principles of Polymer Systems, Rodriguez, 2d ed., McGraw Hill Chemical Engineering Series, p. 38, Table 3-1. DSC was performed by ASTM method E-1356a modified version of ASTM method D-3417. Preferably, about 6 mg to about 10 mg of a sheet of the preferred polymer pressed at approximately 200° C. to 230° C. is removed with a punch die and is aged at room temperature for at least 24 hours. At the end of this period, the sample is placed in a Differential Scanning Calorimeter and cooled to about −50° C. to −70° C. The sample is heated at about 10–20° C./minute to attain a final temperature of about 200° C. to about 220° C. The thermal output is recorded as the area under the melting peak, or peaks, of the sample which is typically at a maximum peak at about 30° C. to about 150° C. and occurs between the temperatures of about 0° C. and about 180° C. The thermal output is measured in Joules as a measure of the heat of melting. The melting point is recorded as the temperature of the greatest heat absorption within the range of melting temperature of the sample.

Melt index (MI) was determined according to ASTM D-1238 (190/2.16). High load MI was determined according to ASTM D-1238 (190/21.6).

Melt Flow Rate (MFR) was measured by ASTM method D-1238(L).

Notched Tensile Test was determined according to ASTM D-1003.

Table 1 shows the properties of the polymers used in the examples prior to blending. PE-1, PE-3, PP-1, and PP-2 were all produced with metallocene catalysts. PE-2 was produced with a Zeigler-Natta catalyst.

TABLE 1

Properties of Polymer Blend Components

| Polymer Properties | PE-1 | PE-2 | PE-3 | PP-1 | PP-2 |
|---|---|---|---|---|---|
| $M_n$ | 44,665 | 48,233 | 23,308 | 26,000 | — |
| $M_w$ | 106,749 | 115,278 | 85,306 | 53,000 | — |
| MWD | 2.39 | 3.96 | 3.66 | 2.10 | — |
| MI | 1.02 | 1.01 | 1.10 | NA | NA |
| MFR | NA | NA | NA | 1896 | 2050 |
| $T_m$, 1st (° C.) | 118 | 125 | 116 | 148 | — |
| Heat of Fusion ($H_f$) J/g | 128 | 128 | 128 | 93 | — |
| $T_m$, 2nd (° C.) | 106 | — | 102 | 145 | — |
| CDBI | 66.7 | 19.0 | 81.8 | NA | NA |
| Density | 0.918 | 0.919 | 0.919 | — | — |

NA — not applicable

Table 2 compares the performance of polyethylenes produced by Zeigler-Natta and metallocene catalyst systems both before and after the addition of high MFR polypropylene.

TABLE 2

PE/PP Blends and Properties

| Example | 1 | 2 | 3 | 4 | 5 | 6 | 7 | 8 | 9 | 10 |
|---|---|---|---|---|---|---|---|---|---|---|
| Comparative/Invention | C | I | I | I | I | C | C | C | C | C |
| PE-1 | 100 | 100 | 100 | 100 | 100 | — | — | — | — | — |
| PE-2 | — | — | — | — | — | 100 | 100 | 100 | 100 | 100 |
| PP-1 | — | 0.5 | 1 | 2 | 5 | — | 0.5 | 1 | 2 | 5 |
| Modulus[1], kpsi (MPa) | 34.2 (235.6) | 39.7 (273.5) | 42.3 (291.4) | 38.2 (263.2) | 38.4 (264.6) | 38.7 (266.6) | 39.9 (274.9) | 44.5 (306.6) | 38.8 (267.3) | 41.6 (286.6) |
| Elongation at Break[1], % | 43.9 | 58.8 | 44.7 | 44.5 | 44.9 | 59.2 | 59.7 | 58.8 | 60.6 | 61.5 |
| Yield Strength[1], kpsi (MPa) | 1.44 (9.92) | 1.46 (10.06) | 1.61 (11.09) | 1.57 (10.82) | 1.50 (10.33) | 1.46 (10.06) | 1.51 (10.40) | 1.53 (10.54) | 1.50 (10.33) | 1.56 (10.75) |
| Yield Elongation[1], % | 14.3 | 11.9 | 12.9 | 13.9 | 13.3 | 12.4 | 12.7 | 11.5 | 13.2 | 12.9 |
| Energy/Thickness[1] lb.-in./in (N-m/m) | 177 (788) | 223 (992) | 196 (872) | 193 (859) | 182 (810) | 227 (1010) | 234 (1041) | 233 (1037) | 239 (1064) | 252 (1121) |
| $T_m$ (1st), °C. [2] | 114.9 | — | 113.6 | — | — | 123.6 | — | 123.0 | — | — |
| delta $H_m$, J/g [2] | 102.8 | — | 106.5 | — | — | 106.8 | — | 81.9 | — | — |
| $T_m$ (2nd), °C. [2] | 116.9 | — | 116.7 | — | — | 124.1 | — | 124.1 | — | — |
| delta $H_m$, J/g [2] | 117.8 | — | 110.9 | — | — | 121.7 | — | 89.4 | — | — |
| $T_c$, °C. [2] | 103.1 | — | 103.0 | — | — | 109.7 | — | 109.3 | — | — |
| delta $H_c$, J/g *[2] | 125.3 | — | 116.7 | — | — | 128.6 | — | 93.9 | — | — |

1 Notched Tensile Test (R.T. @ 0.5"/min. (1.27 cm/min))
2 DSC 10° C./min

The notched tensile test results summarized in Table 2 show that the blends of this invention help achieve a new and unexpected balance of properties. Examples 2–5, as compared to comparative Example 1 (metallocene-produced polyethylene without polypropylene added), show that the addition of minor amounts of high MFR isotactic polypropylene simultaneously improves modulus, tensile strength, elongation at break, yield strength, and energy/thickness to more closely match those of comparative Example 6 (ZN-PE w/o iPP).

Comparative Examples 7–10 show similar improvements when adding the high-MFR polypropylene to Zeigler-Natta catalyzed polyethylene. However, none of the Zeigler-Natta catalyzed polyethylene samples have the superior optical properties or the lower extractables content of polyethylene produced using metallocene catalysts. It is well known that the narrow CD of polymers produced using single site catalysts have lower extractables content than their Zeigler-Natta catalyzed analogs. Since the polypropylene component of the invention will have a lower extractables content than the polyethylene component, the final blends in accordance with the invention will have lower extractables content than similar blends using Zeigler-Natta catalyzed polyethylene.

The results in Table 3 show the balance of properties for metallocene-produced polyethylene films both before and after the addition of high MFR polypropylene.

TABLE 3

Properties of Polymer Blend Components

| Example Type | 11 Control | 12 Invention | 13 Control | 14 Invention |
|---|---|---|---|---|
| PB-1 | 100 | 95 | — | — |
| PE-3 | — | — | 100 | 95 |
| PP-2 | — | 5 | — | 5 |
| Irganox-1010 | 0.2 | 0.2 | 0.2 | 0.2 |
| Gauge(mil) | 1.3 | 1.2 | 1.1 | 1 |
| Gloss | 78.9 | 71.6 | 62.8 | 57.5 |
| Haze | 4.5 | 6.3 | 12.7 | 9.6 |

TABLE 3-continued

Properties of Polymer Blend Components

| Example Type | 11 Control | 12 Invention | 13 Control | 14 Invention |
|---|---|---|---|---|
| Tensile Tear, Y Mod. × $10^4$ psi (MPa) | | | | |
| MD | 1.23 (84.81) | 1.32 (91.01) | 1.25 (86.19) | 1.43 (98.60) |
| TD | 1.27 (87.57) | 1.37 (94.46) | 1.2 (82.74) | 1.53 (105.5) |
| Notch Tensile Tear, Y Mod. psi × $10^4$ (MPa) | | | | |
| MD | 3.05 (210.3) | 3.63 (250.3) | 2.98 (205.5) | 3.67 (253.1) |
| TD | 2.7 (186.2) | 3.44 (237.2) | 3.19 (220.0) | 3.88 (267.5) |
| Elmendorf Tear (g/mil) | | | | |
| MD | 265 | 351 | 231 | 307 |
| TD | 369 | 456 | 377 | 415 |

The gloss and haze test results summarized in Table 3 show that the addition of the polypropylene blend component has little impact on the superior optical properties of the polyethylene films. However, all of the tear test show a significant improvement in tear strength in both the machine direction and the transverse direction by the addition of a minor portion of high MFR polypropylene.

Various changes and modifications in the products and process of this invention can be made without departing from the spirit and scope thereof. The various embodiments which have been disclosed herein were for the purpose of further illustrating the invention but were not intended to limit it.

What is claimed is:

1. A composition comprising
   a) a polyethylene polymer component having a melting temperature greater than or equal to about 75° C., an ethylene crystallinity level of 10 percent or more, a MWD of 4 or less, and a narrow compositional distribution; and
   b) a polypropylene polymer component having a melt flow rate of 500 dg/min. or more at 230° C. and a melting temperature greater than or equal to about 125° C.

2. The composition of claim 1 wherein said ethylene polymer component is selected from a polyethylene homopolymer, a copolymer of ethylene and one or more comonomers, and combinations thereof.

3. The composition of claim 2 wherein said one or more comonomers are selected from $C_3$ to $C_{20}$ α-olefins and combinations thereof.

4. The composition of claim 1 wherein said polyethylene polymer component has a density of from 0.86 to 0.96 g/cc.

5. The composition of claim 4 wherein said polyethylene polymer component has a density of less than 0.93 g/cc.

6. The composition of claim 1 wherein said propylene polymer component is selected from an isotactic polypropylene homopolymer, a copolymer of propylene and one or more comonomers wherein the comonomer content does not exceed 20 mole percent.

7. The composition of claim 6 wherein said propylene polymer component has a heat of fusion of at least 10 J/g.

8. The composition of claim 1 comprising from 90 to 99.9 weight percent of said ethylene polymer component and from 10 to 0.01 weight percent of said polypropylene, both based on the weight of said composition.

9. The composition of claim 8 further comprising one or more additional components selected from a slip agent, a stabilizer, an antioxidant, a filler, a dye, a pigment, and combinations thereof, and wherein the total of all blend components sums to 100 weight percent.

10. The composition of claim 1 having an extractables content of 2 wt. % or less.

11. An article of manufacture comprising the composition of claim 1.

* * * * *